United States Patent [19]
Jonsson et al.

[11] Patent Number: 5,795,109
[45] Date of Patent: Aug. 18, 1998

[54] BLADE-TYPE TOOL HOLDER FOR CUTTING INSERTS

[75] Inventors: Anders Jonsson; Klas Forsström, both of Gävle, Sweden

[73] Assignee: Sandvik AB, Sandviken, Sweden

[21] Appl. No.: 746,265

[22] Filed: Nov. 8, 1996

[30] Foreign Application Priority Data

Nov. 9, 1995 [SE] Sweden ............................ 9503964

[51] Int. Cl.⁶ ....................................................... B23B 29/14
[52] U.S. Cl. ............................ 407/72; 407/110; 407/117
[58] Field of Search ......................... 407/72, 110, 117; 81/488

[56] References Cited

U.S. PATENT DOCUMENTS

| | | | |
|---|---|---|---|
| 383,103 | 5/1888 | Cook | 407/72 X |
| 406,538 | 7/1889 | Rickolson | 81/488 X |
| 4,588,333 | 5/1986 | Gustafson | 407/117 |
| 4,801,224 | 1/1989 | Petterson et al. | 407/110 |
| 4,938,640 | 7/1990 | Pano et al. | 407/110 |
| 5,267,817 | 12/1993 | Englund | 407/110 |
| 5,516,241 | 5/1996 | Plutschuck et al. | 407/110 |

FOREIGN PATENT DOCUMENTS

| | | | |
|---|---|---|---|
| 000491669 | 6/1992 | European Pat. Off. | 407/110 |
| 1400790 | 6/1988 | U.S.S.R. | 407/117 |

Primary Examiner—A. L. Pitts
Assistant Examiner—Henry W. H. Tsai
Attorney, Agent, or Firm—Burns, Doane, Swecker & Mathis, L.L.P.

[57] ABSTRACT

A blade-type holder for a cutting insert includes a blade body having front and rear slots. The front slot is closed at its rear end and open at its front end for receiving a cutting insert. The rear slot has a closed front end spaced rearwardly of the closed rear end of the front slot so that a portion of the blade body disposed between those closed ends defines a spring hinge. The spring hinge interconnects a base and camping portion of the blade body. The base portion is disposed below the slots, and the clamping portion is disposed above the slot. An operator employs a tool to manually apply a downward force to the clamping portion at location rearwardly of the spring hinge to cause the front end of the clamping portion to swing upwardly about the spring hinge, to widen the front slot. After a cutting insert has been replaced, the manual force is released, whereupon the front end is swung downwardly into clamping engagement with the cutting insert by the restoring force of the spring hinge.

19 Claims, 3 Drawing Sheets

BLADE-TYPE TOOL HOLDER FOR CUTTING INSERTS

BACKGROUND OF THE INVENTION

The present invention relates to a clamping arrangement and clamping process for cutting inserts in a holder of the blade type. Such cutting inserts and holders are used for several operations of cutting machining of metallic workpieces, such as parting, grooving (including face grooving) and profiling. Further, within the term "blade type" also slitting cutters are included.

In SE-C-452 713 (& U.S. Pat. No. 4,801,224) a clamping arrangement is disclosed for cutting inserts in a holder of the blade type, comprising a cutting insert that is clampable in a slot in the blade. The cutting insert is clamped by the spring force of a clamping arm defining one wall of the slot of the blade. In order to press the insert into its position in the slot and thereby spread the clamping arm, a special inserting tool is used, which consists of a shaft with two pins at one end. One of the pins is introduced into a prebored hole in the blade holder, the other pin being brought to press against the front side of the insert and push it into the slot, in the manner of a one-arm lever. This arrangement functions satisfactorily as such but is nevertheless marred by a few drawbacks. For instance, the fact that the insert per se forces the springing clamping arm upwards each time an insert is mounted, produces a certain wearing of the contact surface of the clamping arm, which in the long run damages said contact surface, whereby the whole blade holder has to be replaced. Further, there are applications where there is no sufficient space at the side of the blade holder to accommodate an insertion tool. This is for instance the case when several blade holders are mounted in parallel in order to perform two or more simultaneous machining operations.

Also in SE-C-441 247 (& U.S. Pat. No. 4,588,333) a blade holder is disclosed, according to which the insert is clamped in a slot by the spring force that arises when a clamping arm integrated with the blade is bent outwards. According to this construction, the cutting insert is pressed into the insert seat by manual force, e.g., by pressing the end of a hard shaft or bar against the front part of the insert. In a similar way as in SE-C-452 713, the insert is removed by applying one of two pins of said bar behind the insert and forcing it out. Also according to this construction, the insert contact surfaces of the holder are worn each time an insert is put in place or is taken out. Moreover, also here the inconvenience exists that the bar requires a certain minimal access space at the side of the holder.

Thus, a first object of the present invention is to avoid wear of the insert-abutment surfaces of the holder as far as possible.

Another object of the present invention is to maintain a high clamping force upon the insert during long periods of time.

Still another object of the present invention is to construct the clamping arrangement in such a way that there is always sufficient access space for the tool that is used for the clamping and the removal respectively of the cutting insert.

SUMMARY OF THE INVENTION

These and further objects have been achieved by a blade type holder for a cutting insert. The holder comprises a blade body which includes front and rear slots. The front slot is open at a forward end thereof and is closed at a rearward end thereof. The front slot is bordered by top and bottom surfaces, the top surface being disposed on a clamping portion of the blade body, and the bottom surface being disposed on a base portion of the blade body. The rear slot has a closed front end spaced rearwardly from the closed rear end of the front slot, such that a portion of the body disposed between the closed rear end and the closed front end forms a spring hinge between the base portion and the clamping portion. The blade body further includes a shoulder disposed rearwardly of a rear end of the clamping portion and defining a downwardly facing surface adapted to define a fulcrum for an end of a bending key to enable a pressing portion of the bending key to elastically pivot the rear end of the clamping portion downwardly about the spring hinge, whereby the top surface of the front slot is raised away from the bottom surface.

The invention also relates to the process involved in performing the above described manipulations, as well as to a tool for performing those manipulations.

BRIEF DESCRIPTION OF THE DRAWINGS

For illustrative but non-limiting purposes, some preferred embodiments of the invention will now be described with reference to the appended drawings. These are herewith briefly presented.

DETAILED DESCRIPTION OF PREFERRED EMBODIMENTS OF THE INVENTION

Figure 1:
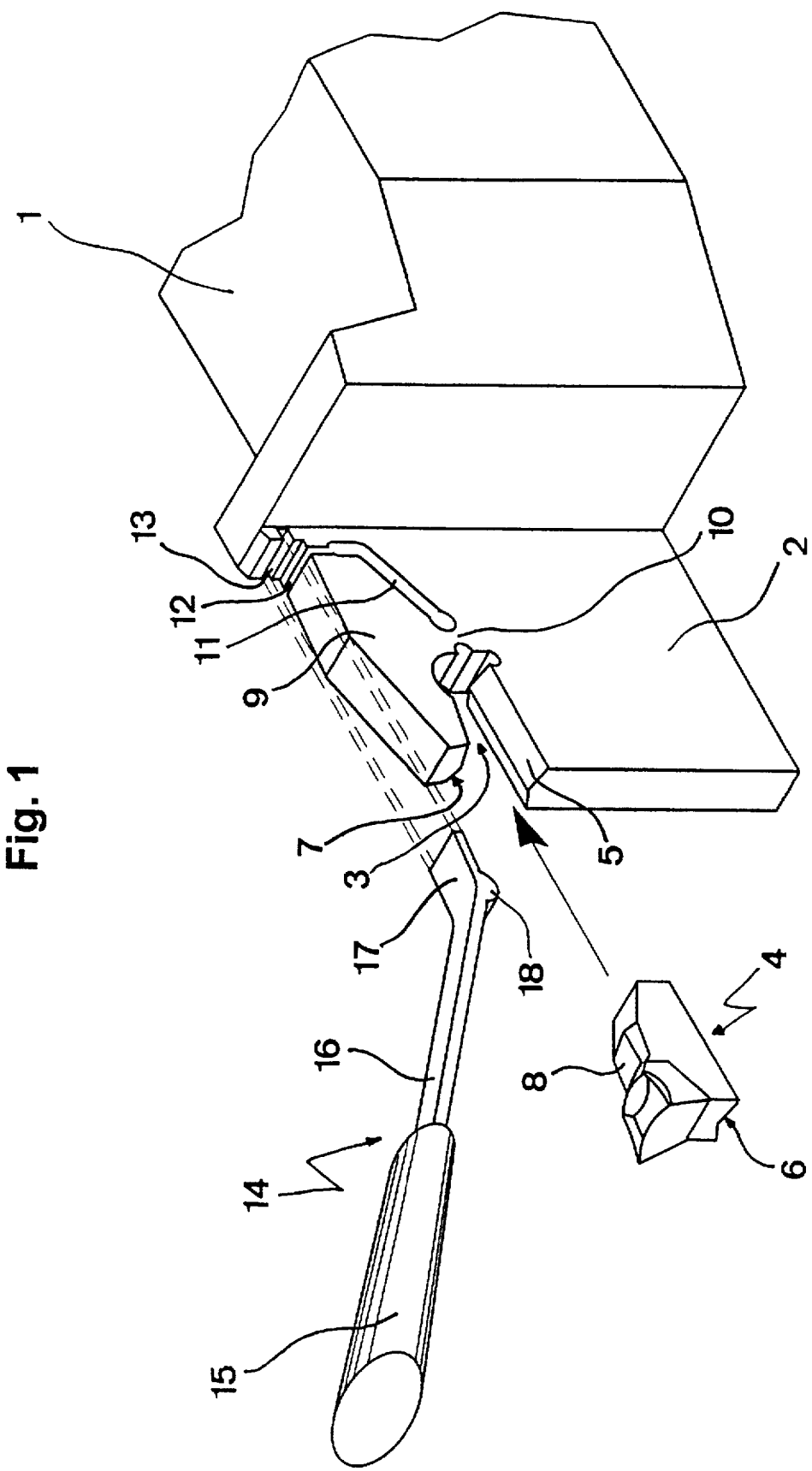
FIG. 1 shows a first embodiment of the invention in a perspective view obliquely from above.

The blade part of an arbitrary holder 1 is generally designated by reference numeral 2. It comprises a front slot 3 that constitutes the cutting position for a cutting insert 4. The shape of the cutting position per se is not an essential feature of the present invention but it must of course match with the shape of the cutting insert. Thus, the lower bearing surface 5 of the slot is formed as an elongated ridge with a V-shaped cross-section, which is intended to bear against a correspondingly elongated recess 6 with a V-shaped cross-section formed in the underside of the cutting insert 4. The top bearing surface 7 of the slot 3 and the upper bearing surface 8 of the cutting insert, respectively, are shaped in a corresponding way.

The top bearing surface 7 is situated on a springing clamp portion 9, that is formed of one piece with the remainder or base 2A of the blade part 2. The transition between the base 2A and the springing clamp portion 9 takes place via a connecting portion 10 that works as a "hinge". That hinge is located between the closed rear end of the front slot 3 and the closed front end of a rear slot 11. The other end of the slot 11 is open, i.e., it communicates with an upper surface 9A of the clamp position 9 to form a reduced-width gap 12 between the rear part of clamp portion 9 and the blade part 2. Possibly, the slot 11 may extend the whole way to the holder 1 as such, the gap 12 being between the clamp portion 9 and the holder 1. In the blade part 2 (or in the holder 1) and above the gap 12 there is provided a recess 13, that may have the shape of a slot open at both short ends, or of a cavity with four or five delimiting walls. The recess 13 is intended to accommodate the end of a bending key 14 whereby a top surface 13A of the slot defines a fixed turning point or fulcrum for the key 14 which thus acts as a one arm lever. According to the illustrated embodiment, the bending key comprises a handle 15 connected to a rear section of a bar 16 whose front section or bending tongue 17 is angled with respect to the rear section. A bead 18 disposed at the intersection of the front and rear sections of the bar projects in a direction away from the angle formed by the front and rear sections.

Figure 2:
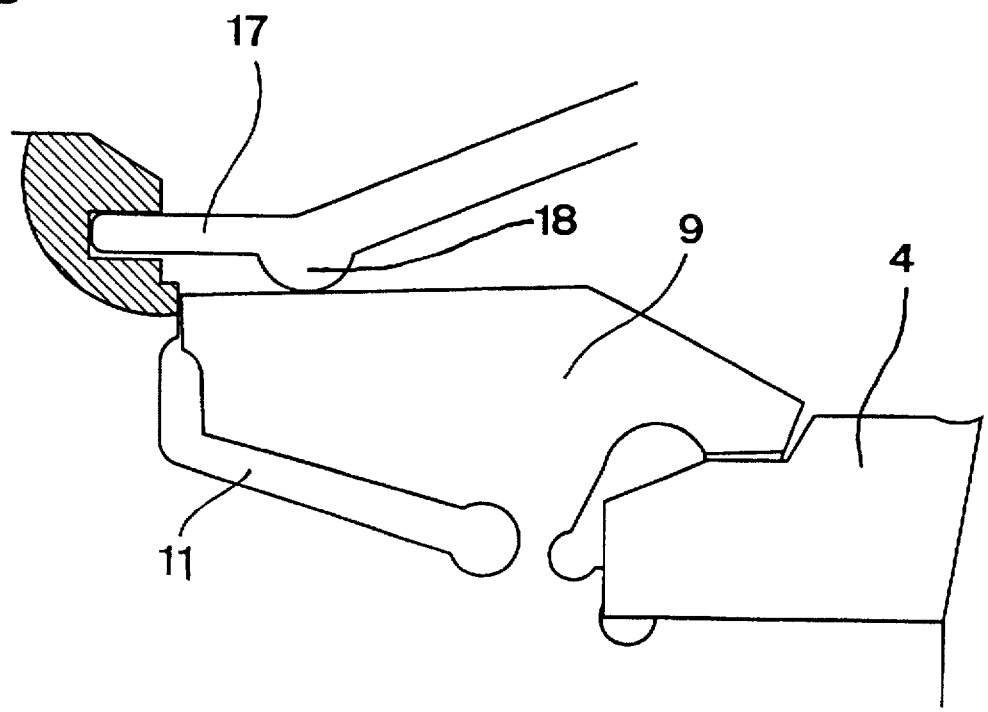
FIG. 2 shows a side view of a cutting position of FIG. 1 when a cutting insert is being mounted with the assistance of a bending key.
Figure 3:
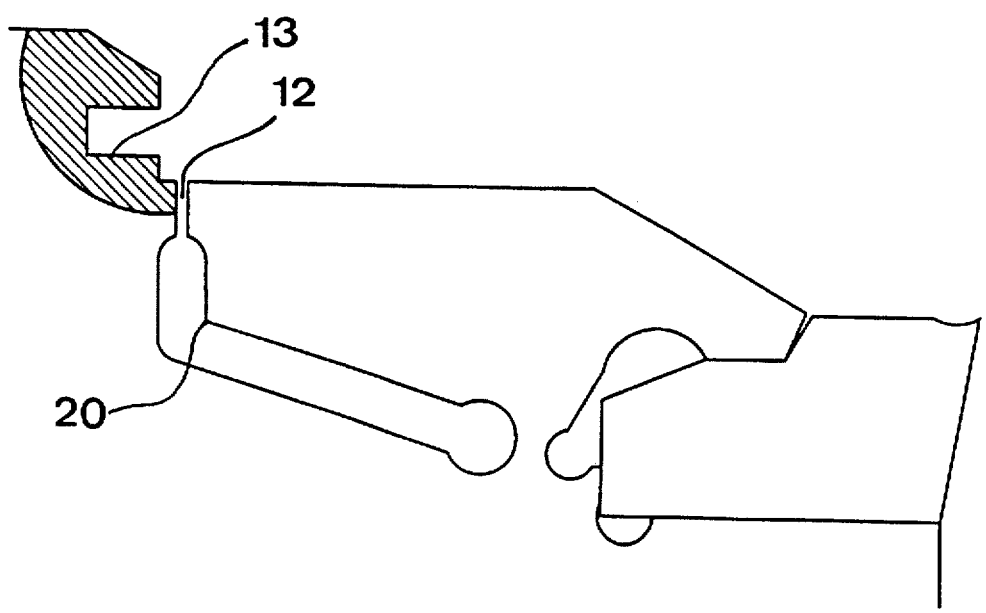
FIG. 3 shows a side view of a cutting position of FIG. 1 after the cutting insert has been mounted.

The operation of the device should be evident. In accordance with FIG. 2, the key 14 is positioned above the upper surface 9A of the clamp portion 9. The bending tongue 17 is inserted into the recess 13, whereafter the operator presses the handle 15 downwards, so that the bead 18 exerts a pressure against the upper surface 9A at a rear portion thereof located rearwardly of the spring hinge 10. That pressure bends (flexes) said rear portion downwards, for instance until the opposed sides of the gap 12 abut against each other as shown in FIG. 2. With this position maintained, a cutting insert 4 is then introduced into the cutting position without any effort, since there now is a play between the bearing surfaces 7 and 8. When the cutting insert has been placed in the desired position, the operator removes the bending key, whereby the clamping portion 9 springs back under its inherent restoring force and clamps the cutting insert as shown in FIG. 3. Of course, the portion 9 does not fully return to its relaxed position, but rather imparts a clamping force.

The maximum magnitude of the bending of the portion 9 should be restricted, in order to avoid an excessive stressing of the hinge part 10 or 10'. In FIGS. 1–3 that is accomplished by a specific width of the gap 12. Alternatively, a wider portion 11A of the slot 11 could be configured such that a section thereof, such as the corner 20 is able to abut an opposing section of the slot portion 11A to limit the amount of bending of the clamp portion 9. In such an embodiment, the gap 12 would be just as wide as, or wider than, the rest of the rear slot.

Figure 4:
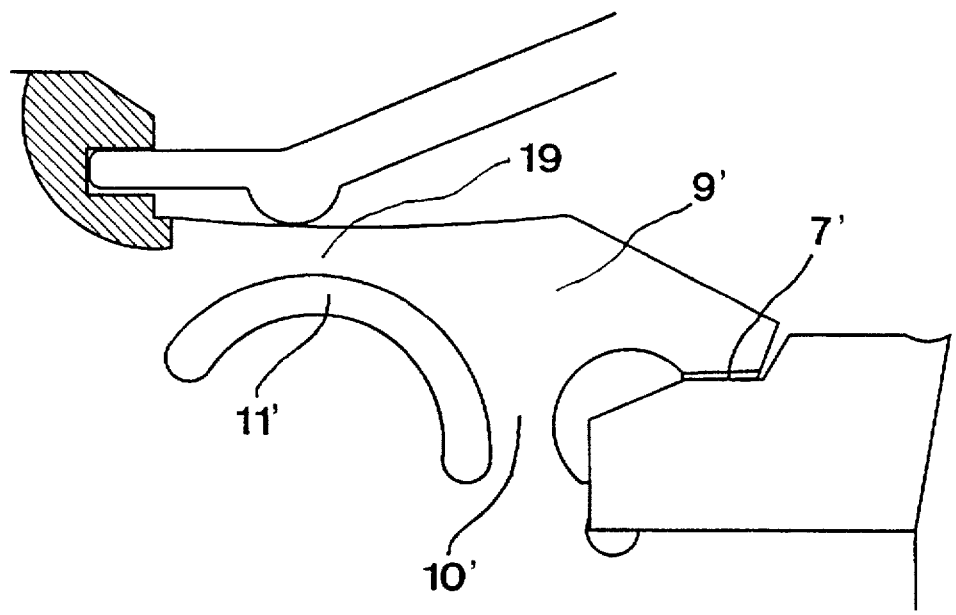
FIG. 4 shows a side view of another embodiment, while the cutting insert is being mounted.
Figure 5:
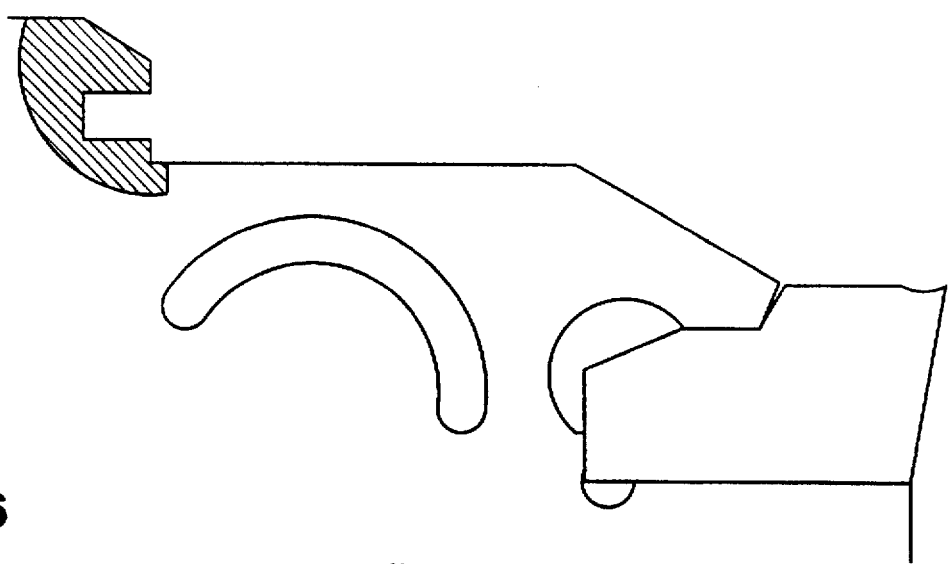
FIG. 5 shows the same embodiment as FIG. 4, with a mounted cutting insert.

As a further embodiment, the rear slot would be completely closed, i.e., no gap 12 being provided. An example of such an embodiment is depicted in FIGS. 4–5 wherein an arc-shaped rear slot 11' is not open at one end, but is entirely enclosed within the blade part 2. Therefore, the clamping portion 9' continues uninterruptedly and transposes into the blade part 2 via a connecting tongue 19 defined by a portion of the blade body situated between a convex side of the rear slot 11' and the upper surface 9A' of the clamping portion. By means of the bending key and the bead 18, this tongue 19 is pressed downwards, whereby the breadth of the slot 11' decreases somewhat, while the bearing surface 7' rises. After the cutting insert has been introduced into the desired position, the bending key is removed, whereby the clamping portion 9' springs back and clamps the cutting insert, analogously with the embodiment according to FIGS. 1 to 3. With the same degree of rising of the bearing surface 7' as that of surface 7, i.e., the same pretensional dislocation, this embodiment gives of course a larger clamping force, since also the bending resistance in the connecting tongue 19 has to be overcome.

Figure 6:
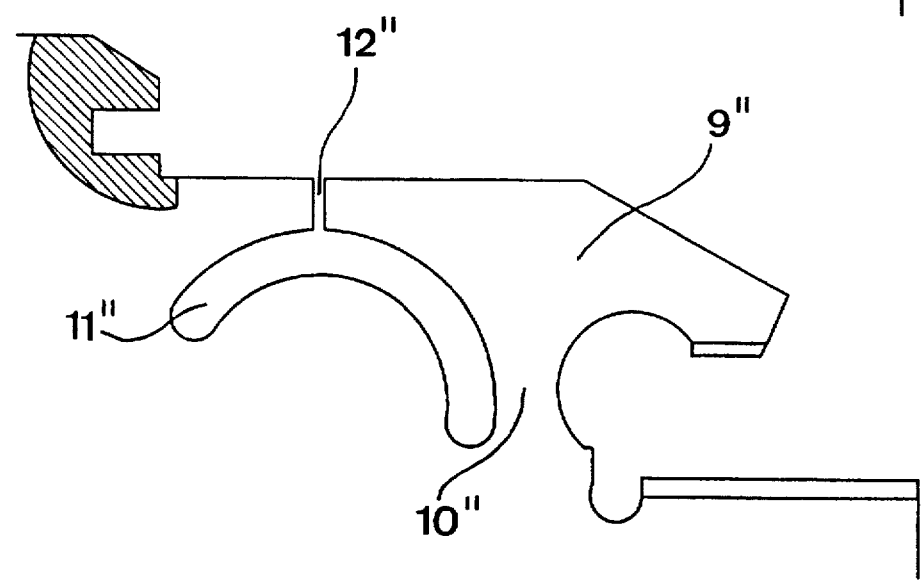
FIG. 6 shows a side view of still another embodiment according to the invention.

Yet another embodiment is shown in FIG. 6 wherein there is a slot 12" which communicates the rear slot with the upper surface 9A, and separates the rear part of the clamping portion 9" from the blade as in FIGS. 1–3. Thus, just as in FIGS. 1 to 3, it is here again only the bending resistance in the hinge part 10" that clamps the cutting insert. The maximum amount of bending of the clamping portion 9" is determined by the breadth of the gap 12".

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed:

1. A blade-type holder for a cutting insert, comprising a blade body which includes:

a front slot open at a forward end thereof and closed at a rearward end thereof, the front slot being bordered by top and bottom surfaces, the top surface disposed on a clamping portion of the blade body, and the bottom surface disposed on a base portion of the blade body;

a rear slot having a closed front end spaced rearwardly from the closed rear end of the front slot, such that a portion of the body disposed between the closed rear end and the closed front end forms a spring hinge between the base portion and the clamping portion, the spring hinge constructed to apply a force biasing the top surface of the front slot toward the bottom surface; and a shoulder disposed rearwardly of a rear end of the clamping portion and defining a downwardly facing surface adapted to define a fulcrum for an end of a bending key to enable a pressing portion of the bending key to elastically pivot the rear end of the clamping portion downwardly about the spring hinge, and counter to the force of the spring hinge, whereby the top surface of the front slot is raised away from the bottom surface, the force of the spring hinge causing the top surface to be lowered when the bending key is released.

2. The holder according to claim 1, wherein the rear slot includes another end which is open.

3. The holder according to claim 2, wherein a section of the rear slot is of reduced width for defining a maximum amount of elastic bending of the clamping portion.

4. The holder according to claim 3, wherein the section of reduced width defines the open end of the rear slot.

5. The holder according to claim 4, wherein the clamping portion includes an upper surface, the open end of the rear slot communicating with the upper surface.

6. The holder according to claim 2, wherein the clamping portion includes an upper surface, the open end of the rear slot communicating with the upper surface.

7. The holder according to claim 1, wherein the rear slot includes another end which is closed.

8. The holder according to claim 1, wherein the clamping portion includes an upper surface, the rear slot being generally arc-shaped, with a convex side thereof facing the upper surface, a portion of the body disposed between the rear slot and the upper surface forming a connecting tongue adapted to be elastically flexed downwardly by a bending key.

9. The holder according to claim 1, in combination with the bending key, the bending key including a downwardly projecting bead for engaging an upper surface of the clamping portion.

10. The holder according to claim 1, including a recess formed in the holder above and rearwardly of an upper surface of the clamping portion, the recess extending generally parallel to the upper surface, an upper wall of the recess defining the shoulder.

11. A process for clamping a cutting insert in a blade-type holder, the holder comprising a blade body including a front slot open at a forward end thereof; the front slot bordered by top and bottom surfaces, the top surface disposed on a clamping portion of the blade body, and the bottom surface disposed on a base portion of the blade body; a rear slot having a closed front and spaced rearwardly from the closed rear end of the front slot, such that a portion of the body disposed between the closed rear end and the closed front end forms a spring hinge between the base portion and the clamping portions; and a shoulder disposed behind a rear end of the clamping portion; the process comprising the steps of:

A. positioning a bending key such that a first portion thereof extends beneath the shoulder, and a second portion engages the clamping portion rearwardly of the spring hinge;

B. applying a manual force to the bending key causing the first portion to engage the shoulder to define a fulcrum therewith, and the second portion to swing downwardly about the fulcrum to elastically bend a front end of the clamping portion upwardly about the spring hinge, whereby the top surface of the front slot moves away from the bottom surface thereof;

C. inserting a cutting insert into the front slot; and

D. releasing the manual force so that the front end of the clamping portion is swung downwardly into clamping relationship with the cutting insert by an elastic restoring force of the spring hinge.

12. The process according to claim 11, wherein the shoulder is defined by a top surface of a recess formed in the holder above and behind an upper surface of the clamping portion; the bending key including a first end defining said first portion of said bending key, and a downwardly projecting bead defining said second portion of said bending key; step B comprising applying a downward force to a second end of the bending key disposed opposite the first end thereof while engaging the bead against the upper surface of the clamping portion.

13. The process according to claim 12, wherein the bending key comprises first and second sections bent at an angle with respect to one another, the first end formed by the first section; and the second section extending forwardly and upwardly from the first section and carrying a handle; step B comprising applying the manual force downwardly against the handle.

14. A blade-type holder for a cutting insert, comprising a blade body which includes:

a front slot open at a forward end thereof and closed at a rearward end thereof, the front slot being bordered by top and bottom surfaces, the top surface disposed on a clamping portion of the blade body, and the bottom surface disposed on a base portion of the blade body;

a rear slot having a closed front end and a closed rear end, the closed front end spaced rearwardly from the closed rear end of the front slot, such that a portion of the body disposed between the closed rear end of the front slot and the closed front end of the rear slot forms a spring hinge between the base portion and the clamping portion; and a shoulder disposed rearwardly of a rear end of the clamping portion and defining a downwardly facing surface adapted to define a fulcrum for an end of a bending key to enable a pressing portion of the bending key to elastically pivot the rear end of the clamping portion downwardly about the spring hinge, whereby the top surface of the front slot is raised away from the bottom surface.

15. A blade-type holder for a cutting insert, comprising a blade body which includes:

a front slot open at a forward end thereof and closed at a rearward end thereof, the front slot being bordered by top and bottom surfaces, the top surface disposed on a clamping portion of the blade body, and the bottom surface disposed on a base portion of the blade body;

a rear slot having a closed front end spaced rearwardly from the closed rear end of the front slot, such that a portion of the body disposed between the closed rear end and the closed front end forms a spring hinge between the base portion and the clamping portion, the clamping portion including an upper surface, the rear slot being generally arc-shaped, with a convex side thereof facing the upper surface, a portion of the body disposed between the rear slot and the upper surface forming a connecting tongue adapted to be elastically flexed downwardly by a bending key; and a shoulder disposed rearwardly of a rear end of the clamping portion and defining a downwardly facing surface adapted to define a fulcrum for an end of a bending key to enable a pressing portion of the bending key to elastically pivot the rear end of the clamping portion downwardly about the spring hinge, whereby the top surface of the front slot is raised away from the bottom surface.

16. The holder according to claim 15, wherein no part of the rear slot communicates with the upper surface.

17. The holder according to claim 15, wherein a rear end of the rear slot is closed, the rear slot communicating with the upper surface through a portion of the body defining a shortest distance between the rear slot and the upper surface.

18. A blade-type holder for a cutting insert, in combination with a bending key;

the bending key including a downwardly projecting bead;

the holder comprising a blade body which includes:

a front slot open at a forward end thereof and closed at a rearward end thereof, the front slot being bordered by top and bottom surfaces, the top surface disposed on a clamping portion of the blade body, and the bottom surface disposed on a base portion of the blade body;

a rear slot having a closed front end spaced rearwardly from the closed rear end of the front slot, such that a portion of the body disposed between the closed rear end and the closed front end forms a spring hinge between the base portion and the clamping portion; and a shoulder disposed rearwardly of a rear end of the clamping portion and defining a downwardly facing surface adapted to define a fulcrum for an end of a bending key to enable the bead of the bending key to press downwardly against an upper surface of the clamping portion to elastically pivot the rear end of the clamping portion downwardly about the spring hinge, whereby the top surface of the front slot is raised away from the bottom surface.

19. A blade-type holder for a cutting insert, comprising a blade body which includes:

a front slot open at a forward end thereof and closed at a rearward end thereof, the front slot being bordered by top and bottom surfaces, the top surface disposed on a clamping portion of the blade body, and the bottom surface disposed on a base portion of the blade body;

a rear slot having a closed front end spaced rearwardly from the closed rear end of the front slot, such that a portion of the body disposed between the closed rear end and the closed front end forms a spring hinge between the base portion and the clamping portion; and a recess formed in the holder above and rearwardly of an upper surface of the clamping portion, the recess extending generally parallel to the upper surface, an upper wall of the recess defining a downwardly facing surface adapted to define a fulcrum for an end of a bending key to enable a pressing portion of the bending key to elastically pivot the rear end of the clamping portion downwardly about the spring hinge, whereby the top surface of the front slot is raised away from the bottom surface.

* * * * *